United States Patent
Park et al.

(10) Patent No.: US 9,530,192 B2
(45) Date of Patent: Dec. 27, 2016

(54) METHOD FOR DETERMINING STEREO QUALITY SCORE AND AUTOMATICALLY IMPROVING THE QUALITY OF STEREO IMAGES

(75) Inventors: Minwoo Park, Pittsford, NY (US); Jiebo Luo, Pittsford, NY (US); Andrew Charles Gallagher, Fairport, NY (US)

(73) Assignee: KODAK ALARIS INC., Rochester, NY (US)

( * ) Notice: Subject to any disclaimer, the term of this patent is extended or adjusted under 35 U.S.C. 154(b) by 451 days.

(21) Appl. No.: 13/173,264

(22) Filed: Jun. 30, 2011

(65) Prior Publication Data
US 2013/0002814 A1  Jan. 3, 2013

(51) Int. Cl.
G06T 5/00   (2006.01)
G06T 7/20   (2006.01)
H04N 13/00  (2006.01)

(52) U.S. Cl.
CPC ............. *G06T 5/006* (2013.01); *G06T 7/2086* (2013.01); *H04N 13/0018* (2013.01); *H04N 13/0022* (2013.01); *H04N 13/0033* (2013.01); *G06T 2207/10021* (2013.01); *G06T 2207/10024* (2013.01); *G06T 2207/20081* (2013.01); *G06T 2207/30168* (2013.01)

(58) Field of Classification Search
CPC ................... G06T 5/006; G06T 7/2086; G06T 2207/10021; G06T 2207/10024; G06T 2207/20081; G06T 2207/30168; H04N 13/0018; H04N 13/0022; H04N 13/0033
See application file for complete search history.

(56) References Cited

U.S. PATENT DOCUMENTS

| | | | |
|---|---|---|---|
| 4,472,037 A | 9/1984 | Lipton | |
| 6,191,809 B1 | 2/2001 | Hori et al. | |
| 6,711,293 B1 | 3/2004 | Lowe | |
| 6,927,769 B2 | 8/2005 | Roche, Jr. | |
| 7,102,686 B1 | 9/2006 | Orimoto et al. | |
| 8,908,987 B1 * | 12/2014 | Krishnaswamy et al. | 382/260 |

(Continued)

OTHER PUBLICATIONS

Op de Beeck et al., "Three dimensional video for the home," Proc. International Conference on Augmented, Virtual Environments and Three-Dimensional Imaging, pp. 188-191 (2001).

(Continued)

*Primary Examiner* — Joseph Ustaris
*Assistant Examiner* — Jill Sechser
(74) *Attorney, Agent, or Firm* — Hogan Lovells US LLP (57) ABSTRACT

A method for improving a stereo image including a left view image and a right view image, comprising: using a data processor to automatically analyze the stereo image to determine an original stereo quality score responsive to relative positions of corresponding points in the left view image and the right view image; specifying a set of one or more candidate modifications to the stereo image; determining revised stereo quality scores based on each of the candidate modifications to the stereo image; selecting a particular candidate modification that produces a revised stereo quality score which indicates a higher quality level than the original stereo quality score; forming an output stereo image corresponding to the selected particular candidate modification; and storing the output stereo image in a processor-accessible memory.

18 Claims, 5 Drawing Sheets

(56) References Cited

U.S. PATENT DOCUMENTS

| | | | |
|---|---|---|---|
| 2004/0240725 A1* | 12/2004 | Xu et al. | 382/154 |
| 2008/0218611 A1 | 9/2008 | Parulski et al. | |
| 2010/0302355 A1* | 12/2010 | Tamaru | 348/59 |
| 2011/0199468 A1 | 8/2011 | Gallagher et al. | |
| 2012/0113093 A1* | 5/2012 | Liao et al. | 345/419 |
| 2012/0316421 A1* | 12/2012 | Kumar et al. | 600/407 |
| 2013/0208009 A1* | 8/2013 | Moden | 345/644 |

OTHER PUBLICATIONS

J. S. McVeigh et al., "Algorithm for automated eye strain reduction in real stereoscopic images and sequences," Human Vision and Electronic Imaging, vol. 2657, pp. 305-316 (1996).

Saxena et al., "Make3d: Learning 3D scene structure from a single still image," IEEE Trans. Pattern Analysis and Machine Intelligence, vol. 31, pp. 824-840 (2009).

Shi et al., "Good features to track," Proc. IEEE Conference on Computer Vision and Pattern Recognition, pp. 593-600 (1994).

Lucas et al., "An iterative image registration technique with an application to stereo vision," Proc. Imaging understanding Workshop, pp. 121-130 (1981).

Sivic et al. In the article "Video Google: a text retrieval approach to object matching in videos," Proc. IEEE International Conference on Computer Vision: pp. 1470-1477 (2003).

Hartley, et al. "Multiple view geometry in computer vision," Cambridge University Press, Second Edition (2004).

Ratakonda, "Real-Time Digital Video Stabilization for Multi-Media Applications," Proc. IEEE International Conference on Computer and Systems, vol. 4, pp. 69-72 (1998).

Shotton et al., "TextonBoost: joint appearance, shape and context modeling for multi-class object recognition and segmentation," Proc. European Conference on Computer Vision, pp. 1-15 (2006).

Snavely et al., "Photo tourism: exploring photo collections in 3D," ACM Transactions on Graphics, pp. 835-846 (2006).

Leordeanu et al., "Smoothing-based Optimization," Proceedings of IEEE Conference on Computer Vision and Pattern Recognition, pp. 1-8 (2008).

* cited by examiner

METHOD FOR DETERMINING STEREO QUALITY SCORE AND AUTOMATICALLY IMPROVING THE QUALITY OF STEREO IMAGES

CROSS-REFERENCE TO RELATED APPLICATIONS

Reference is made to commonly assigned, co-pending U.S. patent application Ser. No. 13/070,670, entitled: "Producing 3D images from captured 2D video", by Park et al., which is incorporated herein by reference.

FIELD OF THE INVENTION

The present invention relates to digital image and video processing, and more particularly to a method for automatically improving stereo images for better perception.

BACKGROUND OF THE INVENTION

Stereo and multi-view imaging has a long and rich history stretching back to the early days of photography. Stereo cameras employ multiple lenses to capture two images, typically from points of view that are horizontally displaced, to represent the scene from two different points of view. Such image pairs are displayed to the left and right eyes of a human viewer to allow the viewer experience an impression of three dimensions (3D). The human visual system can merge information from the pair of properly constructed images to achieve the perception of depth.

Stereo cameras can come in any number of configurations. For example, a lens and a sensor unit can be attached to a port on a traditional single-view digital camera to enable the camera to capture two images from slightly different points of view, as described in U.S. Pat. No. 7,102,686 to Orimoto et al., entitled "Image-capturing apparatus having multiple image capturing units." In this configuration, the lenses and sensors of each unit are similar and enable the interchangeability of parts. U.S. Patent Application Publication 2008/0218611 to Parulski et al., entitled "Method and apparatus for operating a dual lens camera to augment an image," discloses another camera configuration having two lenses and image sensors that can be used to produce stereo images.

Further, it is known that stereo pairs can be constructed in other ways. For example, with a standard single-view camera, two horizontally displaced images can be captured to represent the left- and right-views that the two eyes of a human would see. Still further, a stereo pair of images can be constructed from a single image by first defining the three dimensional geometry of the scene (e.g., as taught by Saxena et al. in the article "Make3D: Learning 3D scene structure from a single still image," published in IEEE Transactions on Pattern Analysis and Machine Intelligence, Vol. 31, pp. 824-840, 2009) Then, standard computer graphics techniques can be used to produce a textured rendering for the left- and right-eyes, using the three-dimensional model as the model and the textures from the single image.

Still further, methods of producing stereo images from videos have also been explored. For example, when the camera pans horizontally when capturing a video of a static scene, pairs of frames including one frame from the video and a second delayed frame from the same video (e.g., a delay of 1/10 seconds) can be combined to produce an acceptable stereo image. This is described in the article "Three dimensional video for the home," by Op de Beeck et al. (Proc. International Conference on Augmented, Virtual Environments and Three-Dimensional Imaging, pp. 188-191, 2001). A similar phenomena is exercised by the well-known Pulfrich effect, where a single dark lens is worn in a pair of spectacles. The dark lens delays the human visual system's processing of the image stream for that eye, effectively producing stereo pairs of images by having one eye see a delayed version of the video.

In another line of teaching, J. S. McVeigh et al, in the article "Algorithm for automated eye strain reduction in real stereoscopic images and sequences," (Human Vision and Electronic Imaging, Vol. 2657, pp. 305-316, 1996) describe a method for reducing eye strain in stereoscopic image viewing. The method describes a statistical model that can measure disparity range and force all points to lie on, or behind the plane of display screen so as to reduce eyestrain. However, it provides no systematic way to automatically improve the perception of 3D in a stereo image by using a model that estimates the quality of the stereo image.

U.S. Pat. No. 6,927,769 to Roche et al., entitled "Stereoscopic image processing on a computer system," discloses a system for producing a stereoscopic image. The system permits a user to load two images into a stereoscopic image pair. In addition it permits a user load a single 3D image to be loaded into a computer to be morphed into a stereoscopic image pair.

U.S. Pat. No. 6,191,809 to Lee et al., entitled "Method of and apparatus for rectifying a stereoscopic image" discloses a method of rectifying a stereoscopic image consisting of left and right captured images comprises determining left and right rectification transformations. The goal of transformation is to minimize vertical disparity between the left and right captured images.

U.S. Pat. No. 4,472,037 to Lipton et al., entitled "Additive color means for the calibration of stereoscopic projection" discloses a method for calibrating right and left image views for both equal and even illumination intensity.

SUMMARY OF THE INVENTION

In accordance with the present invention, there is provided a method for improving a stereo image including a left view image and a right view image, comprising:

using a data processor to automatically analyze the stereo image to determine an original stereo quality score responsive to relative positions of corresponding points in the left view image and the right view image;

specifying a set of one or more candidate modifications to the stereo image;

determining revised stereo quality scores based on each of the candidate modifications to the stereo image;

selecting a particular candidate modification that produces a revised stereo quality score which indicates a higher quality level than the original stereo quality score;

forming an output stereo image corresponding to the selected particular candidate modification; and storing the output stereo image in a processor-accessible memory.

This invention has the advantage that it improves stereo images by applying image modifications that provide improved stereo quality scores. The method can be used to improve the stereo images by correcting for alignment errors between the left and right images, and by adjusting disparity in the stereo image in order to convey a preferred impression of the depth for the scene.

It is to be understood that the drawings are for purposes of illustrating the concepts of the invention and may not be true to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
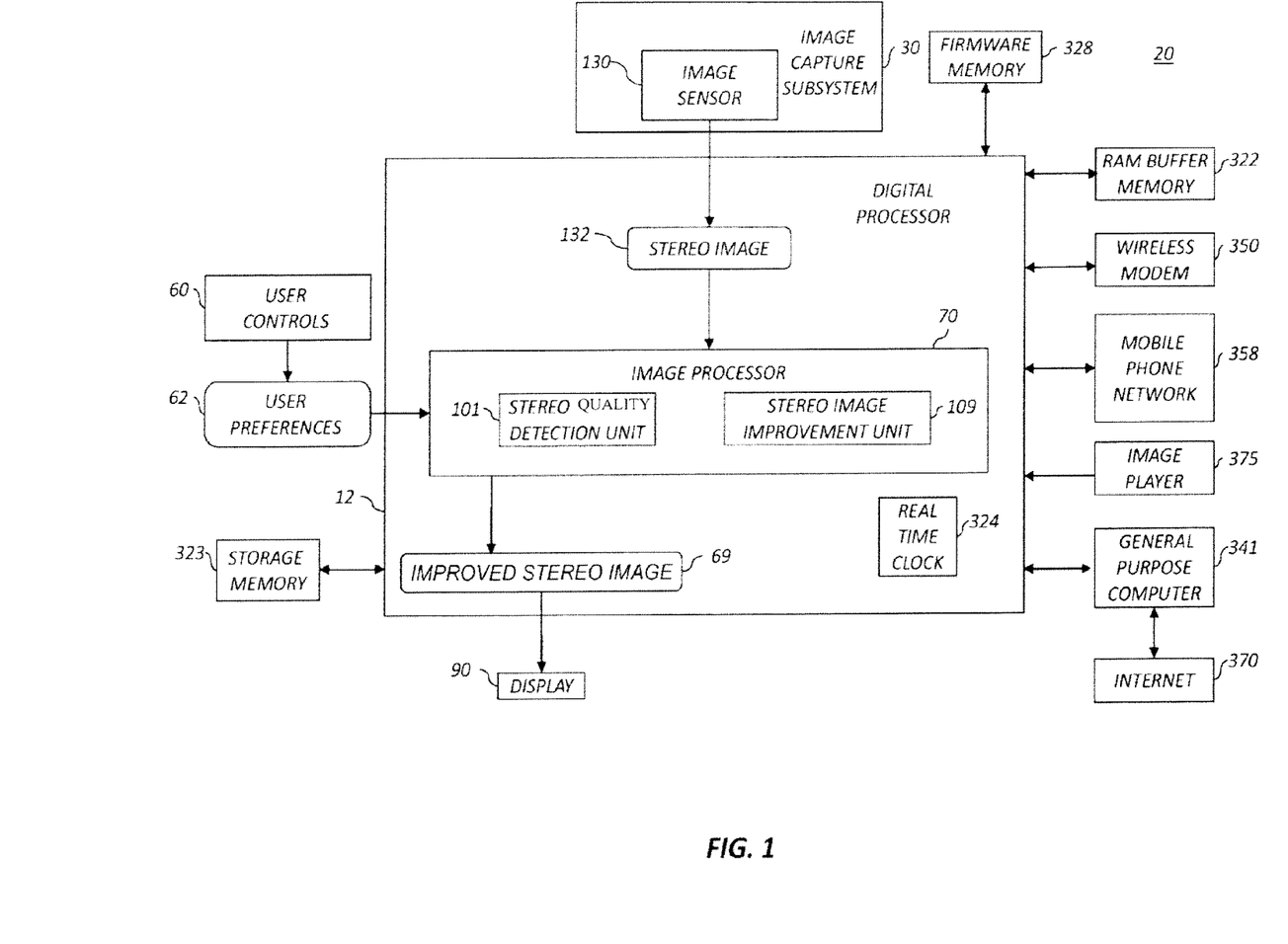
FIG. 1 is a block diagram of a digital imaging system that can be used to practice the present invention.

FIG. 1 is a block diagram of a digital imaging system 20 including an image capture subsystem 30 and an associated digital processor 12 that can be used to implement the present invention according to a preferred embodiment. The present invention can also be implemented for use with any type of digital imaging device, such as a digital still camera, a digital video camera, a camera phone, personal computer, or any other digital imaging system that can capture a stereo image 132.

The image capture subsystem 30 can be a stereo camera that concurrently captures a stereo pair of images. Alternatively, it can be a non-stereo camera that captures a sequence of two or more images from different positions. The image capture subsystem 30 includes one or more image sensors 130 for capturing the stereo image 132. The image sensor 130 includes an array of photosensitive pixels, and can be of any appropriate resolution (e.g., 1280 columns×960 rows of pixels). The image capture subsystem 30 will also contain various other components (not shown) that are necessary for capturing digital images including an optical system for focusing a scene onto the image sensor 130. It can also include optional components such as an electronic flash, which can be activated to provide improved photographic quality in low light conditions.

While the present invention will be described with reference to a stereo image 132 captured with the image capture subsystem 30, it will be understood that it can also be applied to any type of stereo images 132, including computer-generated images, or images constructed post capture by other means of image processing.

The digital data for the stereo image 132 is stored in a RAM buffer memory 322 and subsequently processed by a digital processor 12 controlled by firmware stored in a firmware memory 328, which can be, for example, flash EPROM memory. The digital processor 12 includes a real-time clock 324, which keeps the date and time even when the system and digital processor 12 are in their low power state. The digital imaging system 20 also includes storage memory 323, which can be any processor-accessible data storage device, whether volatile or non-volatile, electronic, magnetic, optical, or otherwise, including but not limited to, registers, floppy disks, hard disks, Compact Discs, DVDs, flash memories, ROMs, and RAMs.

The graphical user interface displayed on the display 90 is controlled by user controls 60. The user controls 60 can include dedicated push buttons (e.g., a telephone keypad) to dial a phone number; a control to set the mode, a joystick controller that includes 4-way control (up, down, left, and right) and a push-button center "OK" switch, or the like. The user controls 60 are used by a user to indicate user preferences 62 or to select various modes of operation or settings for the digital imaging system 20.

It should also be noted that the present invention is implemented in a combination of software and hardware and is not limited to devices that are physically connected or located within the same physical location. The digital processor 12 is coupled to a wireless modem 350, which enables the display system to transmit and receive information via an RF channel. The wireless modem 350 communicates over a radio frequency (e.g., wireless) link with an external system such as a mobile phone network 358 (e.g., a 3GSM network). The mobile phone network 358 can communicate with a network server, which can provide and receive various data in accordance with the present invention. The mobile phone network 358 can also connect to a standard telephone network (not shown) in order to provide normal telephone service.

The digital imaging system 20 can, in some embodiments, access the wireless modem 350, the internet 370 or an image player 375 (e.g., a DVD player) to receive stereo images 132 for processing according the method of the present invention. In some embodiments, the internet 370 can be accessed through a general purpose computer 341. In some embodiments, the interface between the digital imaging system 20 and the general purpose computer 341 can be a wireless interface, such as the well-known Bluetooth wireless interface or the well-known 802.11b wireless interface.

According to a preferred embodiment, an image processor 70 is used to process the input stereo image 132 to provide an improved stereo image 69. The image processor 70 includes a stereo quality detection unit 101 and a stereo image improvement unit 109, which are used to produce the improved stereo image 69, responsive to various user preferences 62. Further, the image processor 70 can also perform other image processing operations to improve the quality of the stereo image 132 (e.g., by improving the brightness and color of the stereo image 132).

The digital imaging system 20 of FIG. 1 also includes an optional display 90 for viewing digital images. The display 90 can use any display technology known in the art, including LCD, CRT, OLED, plasma, or projection displays. In some embodiments, the display 90 contains a touch-screen interface that permits a user to control the device, for example, by touching various user control elements.

In some embodiments, the display 90 can be a stereo display such as described in U.S. patent application Ser. No. 12/705,652 to Gallagher et al., filed Feb. 15, 2010, entitled "3-Dimensional display with preferences." Preferably the display 90 is used to display the improved stereo image 69 that is derived from the stereo image 132. Some displays 90 that display stereo images require that the viewer wear special eyewear such as shutter glasses or polarizing glasses. Other displays 90 are capable of providing a viewer with a unique image for each eye to convey the impression of depth using, for example, barriers or lenticular surfaces (autostereoscopic displays). Even with a standard 2D display 90, stereo images can be effectively shown to a viewer using the well-known anaglyph method, where the viewer wears anaglyph glasses with one red lens and another blue lens to view an anaglyph image produced using the red channel of the left viewpoint image and the blue (and sometimes green) channels of the right viewpoint image.

The present invention is directed towards improving a stereo image 132. As used herein, a stereo image 132 is an image of a scene containing images of substantially the same scene from at least two different viewpoints. Typically, the stereo image 132 includes left- and right-view images of a rigid scene. The stereo image 132 can be produced by literally photographing a scene from two different camera positions, or by other methods (e.g., by fixing the position of a camera and capturing a first image of the scene from one position, and then moving the scene and then capturing a second image of the scene.) The important aspect of the stereo image 132 is that, relative to the scene, the scene is captured from at least two different points of view and scene must be substantially rigid.

Figure 2:
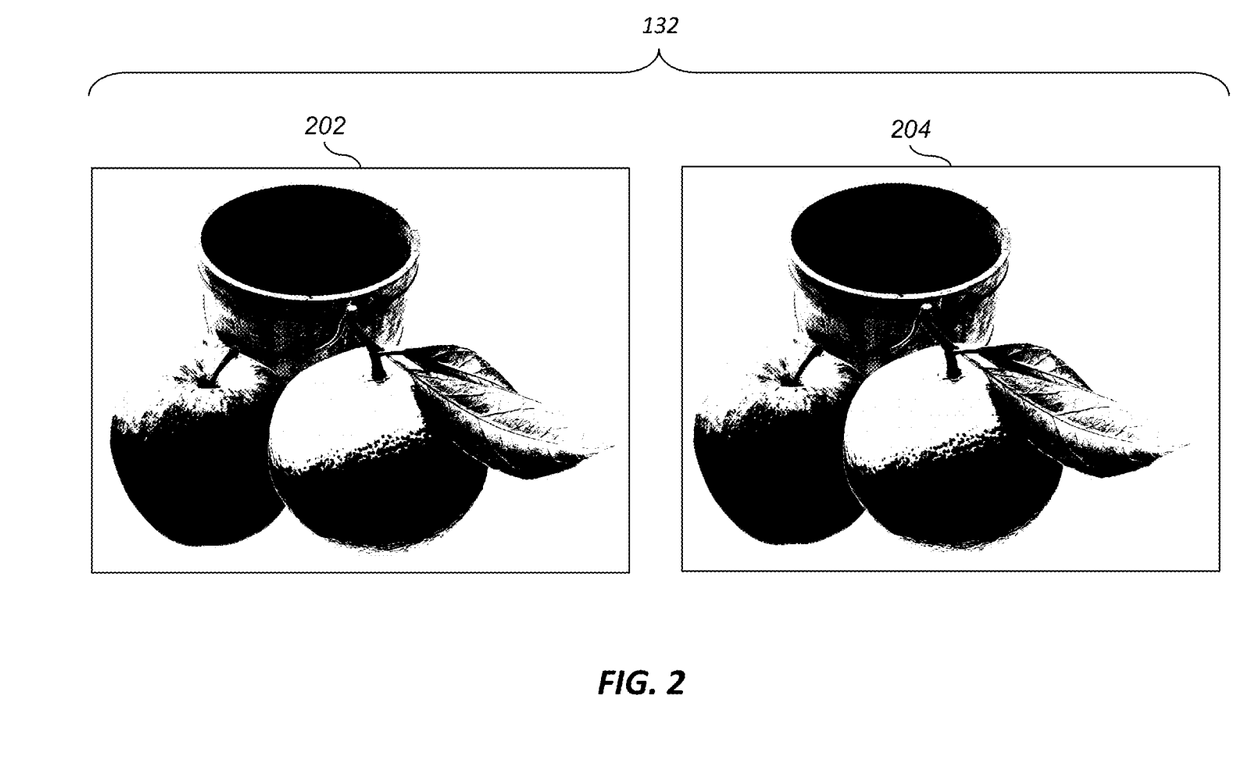
FIG. 2 illustrates an example of a stereo image including a left view image and a right view image.

FIG. 2 illustrates a left view image 202 and a right view image 204 of a typical stereo image 132. In some embodiments, the stereo image 132 is an anaglyph image where the red channel of the left view image 202 is assigned to the red channel of the anaglyph image and the blue and green channels of the right view image 204 are assigned to the corresponding blue and green channels of the anaglyph image.

Figure 3:
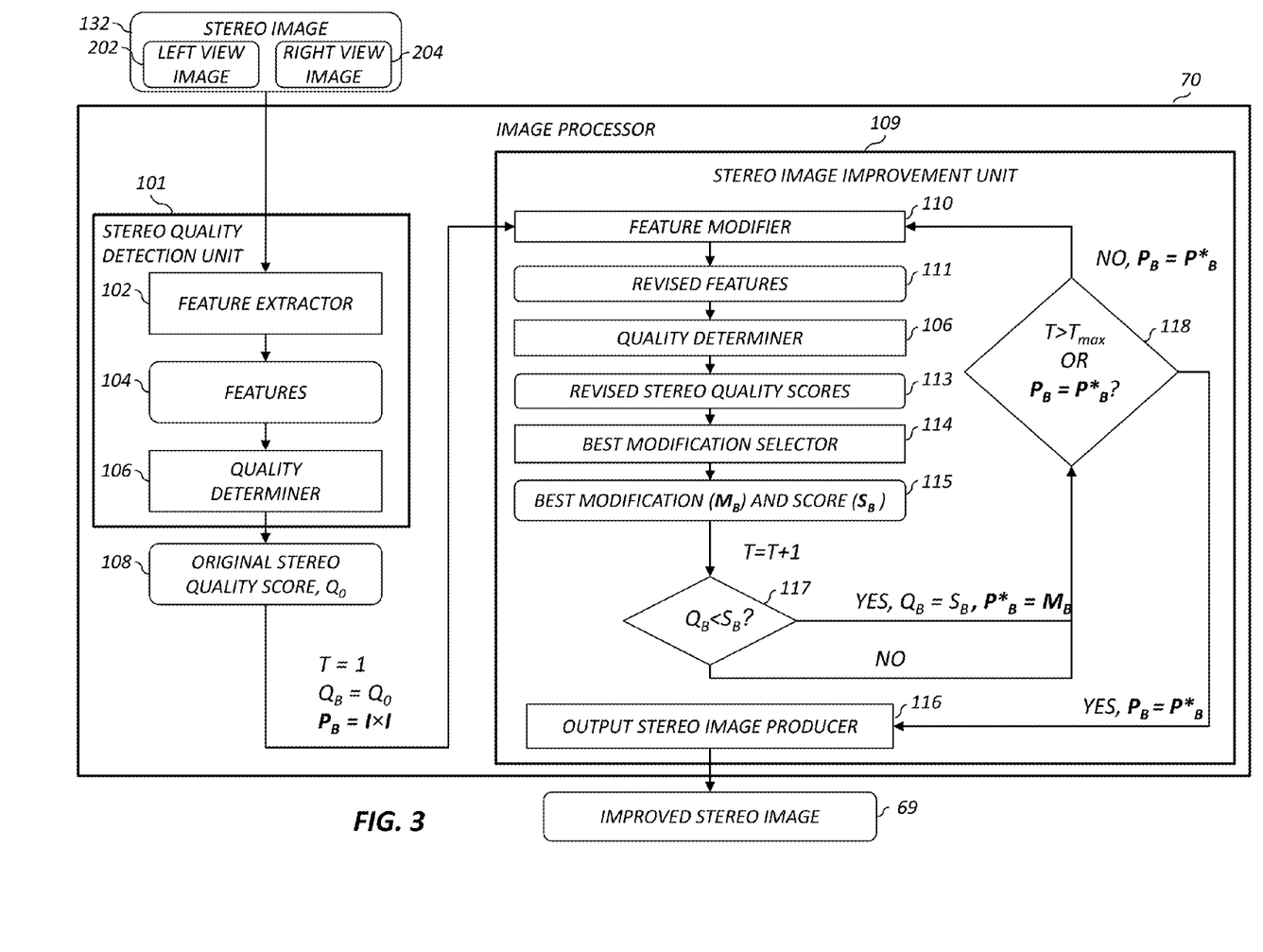
FIG. 3 is a flow diagram illustrating a method for improving a stereo image in accordance with the present invention.

FIG. 3 illustrates the method of the invention in more detail according to a preferred embodiment. The image processor 70 includes the stereo quality detection unit 101 and the stereo image improvement unit 109. The stereo quality detection unit 101 receives the stereo image 132 including left view image 202 and right view image 204, and, after processing, determines an original stereo quality score 108 ($Q_0$). The stereo image improvement unit 109 then produces the improved stereo image 69. Broadly speaking, the stereo quality detection unit 101 is directed at extracting features 104 and identifying the original stereo quality score 108 from the stereo image 132. Then a series of processing steps in the stereo image improvement unit 109 produces the improved stereo image 69 accompanied by an improvement in the stereo quality as indicated by a revised stereo quality score 113 that is higher than the original stereo quality score 108.

Now, in more detail, the stereo image 132 is the input to a feature extractor 102 for extracting a set of features 104 from the left view image 202 and the right view image 204 from the stereo image 132. Many different types of features 104 can be computed for the stereo image 132. In a preferred embodiment, the features 104 includes a set of motion vectors determined for a set of corresponding points in the left view image 202 and the right view image 204, together with various metrics computed from the set of motion vectors. In alternate embodiments, the features 104 can also include other types of features, such as color histogram features and salient region features.

The features 104 for the stereo image 132 can be represented as a feature vector F. To compute the set of motion vectors, the well-known KLT (Kanade-Lucas-Tomasi) feature tracking algorithm described by Shi et al. in the article "Good features to track" (Proceedings of IEEE Conference on Computer Vision and Pattern Recognition, pp. 593-600, 1994), can be used to detect interest points called KLT features in the left view image 202. Next, the interest points are tracked across the left view image 202 and the right view image 204 to establish a correspondence between interest point locations in the left view image 202 and the right view image 204. This tracking process is also described by Lucas et al. in an article entitled "An iterative image registration technique with an application to stereo vision" (Proceedings of Imaging Understanding Workshop, pp. 121-130, 1981). The KLT feature is extracted from the left view image 202 and tracked over the right view image 204. If the stereo image 132 is an anaglyph image, the KLT feature is extracted from the red channel of the left view image 202 and tracked over the green channel of the right view image 204.

In some embodiments, the set of motion vectors can be further processed to remove extraneous motion vectors. This can be done by enforcing geometric consistency between the corresponding points, as, for example, is described by Sivic et al. in the article "Video Google: a text retrieval approach to object matching in videos" (Proceeding of IEEE International Conference on Computer Vision: pp. 1470-1477, 2003).

Figure 4A:
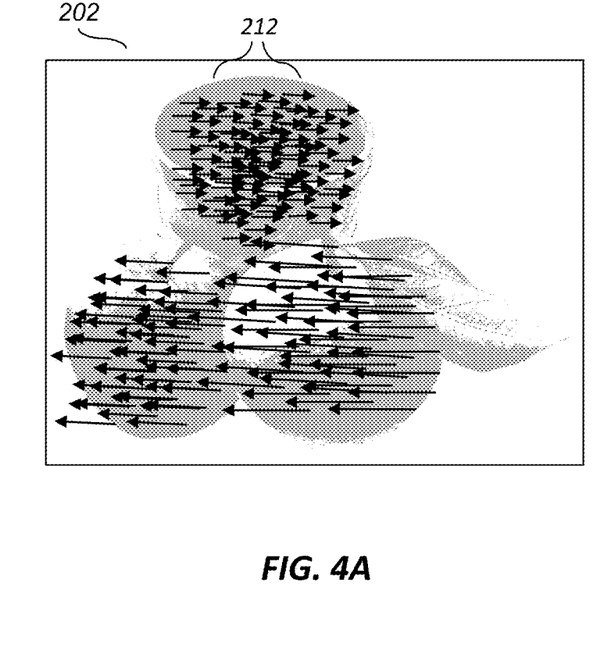
FIG. 4A illustrates a set motion vectors for determined for the stereo image of FIG. 2.

FIG. 4A shows an example of the left view image 202 from FIG. 2, together with a set of motion vectors 212 pointing from the KLT points identified in the left view image 202 to the locations of corresponding tracked points in the right view image 204 (FIG. 2). The collection of motion vectors 212 is included in the features 104 (FIG. 3) for the stereo image 132 and describes the apparent "motion" induced due to stereo.

In other embodiments, different methods can be used to determine the motion vectors. For example, the well-known SIFT (scale invariant feature transform) feature point matching method described in U.S. Pat. No. 6,711,293 to Lowe, entitled "Method and apparatus for identifying scale invariant features in an image and use of same for locating an object in an image," can be used to determine the set of motion vectors.

The set of features 104 can also include additional features related to the camera motion between the left view image 202 and the right view image 204 in the stereo image 132. In a preferred embodiment, the well-known RANSAC-based epipolar geometry estimation algorithm can be used to quantify camera motion. A description of this algorithm can be found in chapters 9-11 in the book "Multiple view geometry in computer vision," by Hartley, et al. (Cambridge University Press, Second Edition, 2004).

Other methods for quantifying camera motion can also be used in accordance with the present invention. One computationally efficient approach for quantifying camera motion is computed by assuming a translational motion model and computing the horizontal and vertical translational motion between each pair of consecutive image frames. This can be performed by using an integral projection matching algorithm, as described by Ratakonda in the article "Real-Time Digital Video Stabilization for Multi-Media Applications" (Proceedings of IEEE International Conference on Computer and Systems, Vol. 4, pp. 69-72, 1998).

Figure 5:
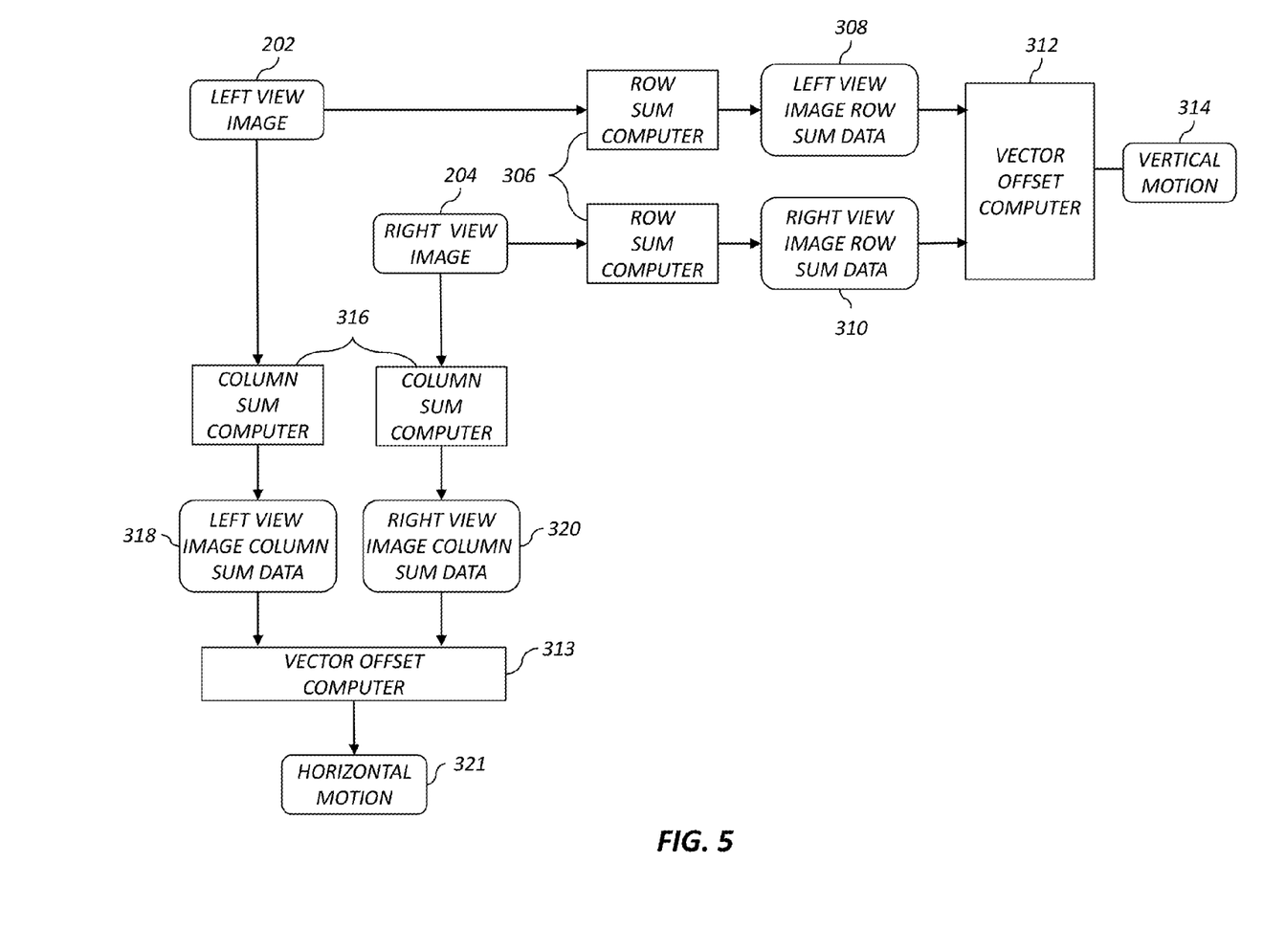
FIG. 5 illustrates a method for estimating features in a stereoscopic digital video related to vertical and horizontal motion.

This process is illustrated in FIG. 5. The left view image 202 and the right view image 204 in the stereo image 132 (FIG. 2) are the inputs for the integral projection matching algorithm. The left view image 202 is input to a row sum computer 306 which computes a vector of left image row sum data 308, that is to say for each row of the left view image 202, it computes the sum of all pixel data values in that row. Similarly, the right view image 204 is input to a row sum computer 306 which computes a vector of right image row sum data 310. The left view image row sum data 308 and right view image row sum data 310 are input to a vector offset computer 312, which computes the offset that best matches the two input vectors. Those skilled in the art will recognize that there are many methods by which to find the best matching offset between two vectors, including maximizing cross correlation or minimizing the sum of squared errors. In a preferred embodiment, the best offset is determined by minimizing the sum of absolute errors. The determined best offset represents a vertical motion 314 between the left view image 202 and right view image 204.

Similar steps are used to determine the horizontal motion between the left view image 202 and the right view image 204. Specifically, the left view image 202 is the input to a column sum computer 316 which computes a vector of left view image column sum data 318, that is, for each column of the left view image 202, it computes the sum of all pixel data values in that column. Similarly, the right view image 204 is the input to the column sum computer 316 which computes a vector of right image column sum data 320. The left view image column sum data 318 and right view image column sum data 320 are the input to a vector offset computer 313, which computes the offset that best matches the two input vectors. The determined best offset represents a horizontal motion 321 between the left view image 202 and right view image 204.

In other embodiments, the features 104 can include features representing detected objects in the stereo image 132, such as faces, grass, trees, sky, people and water. Detecting objects in images is a well known problem for which many solutions have been described, such as that disclosed by Shotton et al. in the article "TextonBoost: joint appearance, shape and context modeling for multi-class object recognition and segmentation" (Proceedings Of European Conference on Computer Vision, pp. 1-15, 2006).

In other embodiments, the features 104 can include a ratio of the number of pixels in red- and cyan-like colors over the total number of pixels in the stereo image 132. The ratio can be computed as follows: 1) in case that the stereo image 132 is not in the form of anaglyph, convert the stereo image 132 to an anaglyph image by putting a red channel of the left view image 202 on a red channel of the anaglyph image and putting a green and blue channels of the right view image 204 on a green and blue channels of the anaglyph image, 2) convert the anaglyph image to the well-known HSV color space, 3) compute the ratio of the number of pixels belong to red- and cyan-like colors to the number of all pixels using Eq. (1):

$$R_{RC} = \frac{\sum_{pixels} L \begin{pmatrix} (-20 < h < 20 \text{ or } 160 < h < 200) \\ \text{and } s \geq 0.5 \text{ and } v \geq 0.5 \end{pmatrix}}{width \times height} \quad (1)$$

where width and height are the dimensions of the anaglyph image, h, s and v values are hue, saturation and value from the HSV color space, respectively, and L(x) is a logical operator returning a value of 1 if the statement x is true or returning a value of 0 if the statement x is false. It can be seen that the numerator has the effect of counting the number of pixels in the anaglyph image that satisfy a set of hue, saturation and value conditions.

In a preferred embodiment, the feature extractor 102 computes the following set of features 104, for use by the quality determiner 106:

1. Motion vectors between corresponding points in the left view image 202 and the right view image 204.
2. Average flow over all tracked points.
3. Ratio of the average horizontal flow divided by the average vertical flow.
4. Average angle of epipolar lines.
5. Variance of angle of epipolar lines.
6. Average flow of epipolar inliers.
7. Standard deviation of epipolar inliers' flows.
8. Ratio of average horizontal flows over average vertical flows of epipolar inliers.
9. Ratio of standard deviation of horizontal flows over standard deviation of vertical flows of epipolar inliers.
10. Average flows of epipolar outliers.
11. Standard deviation of epipolar outliers' flow vectors.
12. Boolean value indicating whether the epipole is inside image
13. Eigenvalues of 2D scatter matrix with respect to epipolar inliers' flow vectors.
14. Ratio of the largest eigenvalue over the smallest eigenvalue for 2D scatter matrix with respect to epipolar inliers' flow vectors.
15. Eigenvectors of the 2D scatter matrix with respect to epipolar inliers' flow vectors.
16. Eigen values of the 2D scatter matrix with respect to epipolar inliers.
17. Eigenvectors of the 2D scatter matrix with respect to epipolar inliers.
18. Locations of epipoles 1 and 2.
19. Angle of line connecting centers of image and epipoles.
20. Ratio of the number of epipolar inliers divided by the total number of motion vectors.
21. Estimates of the camera motion (i.e. relative camera positions) between the left view image 202 and the right view images 204. This can be estimated using standard structure from motion approaches.
22. Estimates of the 3D points and their mean and variance.
23. Average of epipolar inliers' flow in image focus regions 213
24. Variance of epipolar inliers' flow in image focus regions 213

Figure 4B:
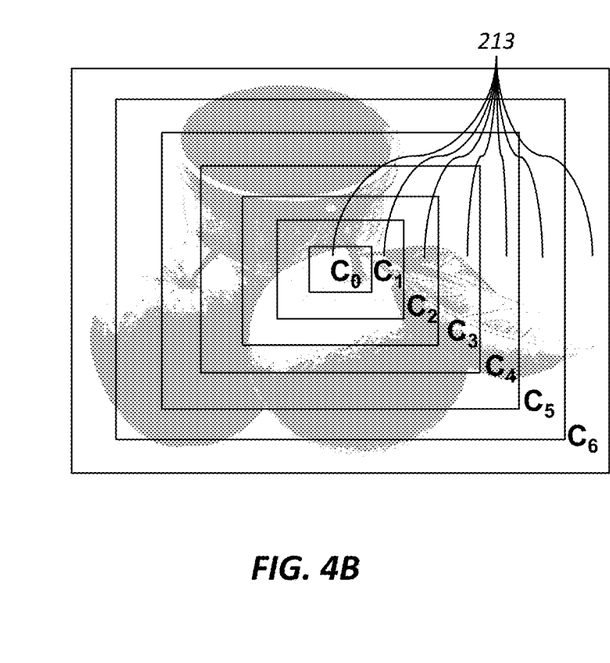
FIG. 4B illustrates image focus regions used for computing features.

Features #2 and #3 can be calculated from the motion vectors using simple statistical calculations. Features #4-#20 can be calculated from the motion vectors by determining the well-known epipolar geometry characteristics using the RANSAC-based epipolar geometry estimation algorithm (as described in chapters 9-11 of the aforementioned book by Hartley et al.), and then applying standard statistical calculations. Features #21 and #22 can be calculated using well-known structure from motion algorithms (e.g., see Snavely et al., "Photo tourism: exploring photo collections in 3D," ACM Transactions on Graphics, pp. 835-846, 2006). Motion vectors capture the change in the relative position of corresponding feature points between the left view image 202 and the right view image 204. Because the stereo suitability score relies on motion vectors for its computation, it is determined responsive to the relative positions of corresponding features in a pair of digital images. FIG. 4B shows a set of image focus regions 213 ($C_0$-$C_6$). Feature #23 and #24 can be calculated from the motion vectors belong to each of the image focus regions 213 using simple statistical calculations.

Returning now to a discussion of FIG. 3, a quality determiner 106 is used to analyze the features 104 to produce an original stereo quality score 108 ($Q_O$) for the stereo image 132. The quality score provides an indication of the quality of the stereo image 132. In a preferred embodiment, the quality determiner 106 uses a classifier from the field of machine learning, and can incorporate any known classification or regression algorithm. Any appropriate type of classifier known in the art can be used in accordance with the present invention. In a preferred embodiment, the classifier is a support vector machine classifier.

The classifier used by the quality determiner 106 can be trained using standard methods of machine learning with examples of stereo image frames that are judged to have highest quality, examples of stereo image frames that are judged to have high quality, examples of stereo image frames that are judged to have medium quality, and examples of stereo image frames that are judged to have low quality for perception of 3D. For example, stereo image frames that would have low quality for perception of 3D would correspond to cases where the alignment of the left view image 202 and the right view image 204 is not done properly and as a result perception of 3D either takes a long time or gives substantial eye fatigue. On the other hand, examples of stereo image frames that would produce high quality correspond to cases where the alignment of the left view image 202 and the right view image 204 is done properly so that the perception of 3D does not take a long time and results in less eye strain.

The quality determiner 106 is used to analyze the features 104 determined for stereo image 132, including the distributions of motion vectors 212 (shown in FIG. 4A), to determine quantitative quality scores (Q). In a preferred embodiment, the quality scores are calculated such that they range numerically from 0 (low quality) to +3.0 (high quality). The quality determiner 106 can be configured either with manual parameter tuning, or by using machine-learning techniques. In the preferred embodiment of invention, a random forest classifier is trained with the training set of images containing the low (Q=0), medium (Q=1), high (Q=2), and highest quality (Q=3) samples. In other embodiments, the quality score can be 0 to λ where λ can be any positive number.

Once trained, the classifier can be used to determine a quality score for the stereo image 132 as a function of the corresponding features 104. Random forest classifiers are well-known in the machine learning art. It will be obvious to one skilled in the art that other forms of classifiers can also be used in accordance with the present invention.

Mathematically, to train a classifier that can determine the stereo quality for a stereo image 132 as an output, stereo quality values need to be determined for the training set. In a preferred embodiment, the stereo quality values for the training set can be determined by evaluating the stereo image using human observers. In other embodiments, the stereo quality can be estimated using various objective metrics. One measure of stereo quality is related to the range of depths corresponding to the range of motion vectors between the left and right view image in the stereo image 132. A small range of depths would correspond to a low stereo quality since it would appear to be flat and would not enable significant 3D perception. In one embodiment a standard deviation of the epipolar inliers' horizontal flows can be used as a quantitative estimate of the stereo quality. However, it will be obvious to one skilled in the art that any appropriate measure of stereo quality can be used to evaluate the training set that is used to train the classifier.

The original stereo quality score 108 ($Q_O$) and the feature 104 along with initialized iteration parameters T, $Q_B$, and $P_B$ (T=1, $Q_B$=$Q_O$, $P_B$=I×I) are received by a stereo image improvement unit 109, where T is the iteration number, $Q_B$ is the current best quality score, $P_B$ is the current best set of modification, and I is an identity matrix. A feature modifier 110 specifies a set of one or more candidate image transformations to the stereo image 132 and computes a set of revised features 111.

In the preferred embodiment, a set of one or more candidate image transformations is obtained by a systematic sampling of a set of different parameters that define the candidate image transformation, which will be explained in more detail when the set of parameters are introduced. The systematic sampling can be performed by any of several sampling systems to obtain a value for each parameter of the transformation. In one embodiment, the systematic sampling includes selecting a random value for each of the parameters, where each random value is drawn from a predefined distribution (e.g. a normal distribution having a specified mean and variance, or a uniform distribution over an interval). In other embodiments, the systematic sampling of the parameters can be performed by pre-selecting a discrete number of samples (e.g., 10) according to a regular pattern spaced apart by a predefined interval. Each parameter set can be assured to be different from all others by incrementing the index of the sample that is selected for each parameter with each trial. For example, if there are 7 parameters, each of which has 2 possible values, then the systematic sampling of all combinations of parameters results in $2^7$=128 possible parameter combinations.

The feature modifier 110 specifies candidate image transformations to the stereo image 132 to produce the revised features 111. The candidate image transformations include applying a geometric transform to the left view image 202, or the right view image 204, or both. In a preferred embodiment, the geometric transform is a 2D translation operation. In some embodiments, the geometric transform includes a 2D translation, a rotation, or a scaling operation. The geometric transformations can be used to provide modified stereo images having an improved quality by correcting for alignment errors between the left view image 202 and the right view image 204 (for example due to a vertical shift or angular rotation of the camera that may have occurred at the time of image capture). The geometric transformations can also be used to adjust the position of the plane of zero disparity in the 3D image by applying horizontal translations. Typically, a preferred impression of depth is objected when there are some objects that appear to be in front of the plane of zero disparity, and other objects that appear to be behind the plane of zero disparity.

In some embodiments, the feature modifier 110 applies a set of modifications to the stereo image 132, and then applies the feature extractor 102 to determine the revised features 111. In a preferred embodiment, the feature modifier 110 applies a set of modifications directly to the features 104 to produce the revised features 111 without actually applying the set of candidate image transformations to stereo image 132. This is possible because a subset of the features, feature set #1 is a set of motion vectors which can be updated directly by applying the geometrical transforms to the appropriate endpoint. Feature sets #2-24 can then be computed from the revised feature set #1.

In some embodiments, when some of the features 104 are independent of feature set #1, it may be necessary to apply the set of image transformations to the stereo image 132 in order to compute the revised features 111. Still in other embodiments, when some of the features are not geometric features, a series of image transformations comprising geometric and photometric transformations can be applied to the stereo image 132. Photometric transformations could include, for example a tone-scale transformation that adjusts the brightness or contrast of one or both of the left view image 202 and the right view image 204. They could also include color adjustment transforms to adjust the hue, saturation or lightness of one or both of the left view image 202 and the right view image 204.

In a preferred embodiment, the image transformation (e.g., the geometric or photometric transformations) are global transformation that are applied to the entire left view image 202 and the right view image 204, or both. In some embodiments, the set of image transformations can include local image transformations that are applied to local image regions. For example, an object detection algorithm can be used to identify individual objects in the stereo image 132. Object detection algorithms are well known in the art. Individual geometrical transforms can then be used to independent adjust the positions of different objects. For example, the positions of more distant objects can be adjusted by larger amounts in order to enhance the amount of perceived 3D effect.

In a preferred embodiment, a set of N candidate modifications is given as:

$$P_k = R^{(k)} \begin{bmatrix} s_x^{(k)} & 0 & -o_x^{(k)} \\ 0 & s_y^{(k)} & -o_y^{(k)} \\ 0 & 0 & 1 \end{bmatrix} \quad (2)$$

where k is the modification number (k=1 to N), $R^{(k)}$ is a Euler's 3D rotation matrix, $s_x^{(k)}$ and $s_y^{(k)}$ are scales for the x and y axes, and $o_x^{(k)}$ and $o_y^{(k)}$ are 2D offsets. The $P_k$ values are specified by drawing N samples from a Gaussian distribution with a mean $M=[m_{\theta x}, m_{\theta y}, m_{\theta z}, m_{sx}, m_{sy}, m_{ox}, m_{oy}]^T$ and a covariance matrix $C=\text{diag}(\sigma_{\theta x}, \sigma_{\theta y}, \sigma_{\theta z}, \sigma_{sx}, \sigma_{sy}, \sigma_{ox}, \sigma_{oy})$ where $m_{\theta x}, m_{\theta y}, m_{\theta z}, m_{sx}, m_{sy}, m_{ox}$, and $m_o$ are means of a rotation about x axis, a rotation about y axis, a rotation about z axis, a scale in x axis, a scale in y axis, a offset in x axis, and an offset in y axis respectively, and $\sigma_{\theta x}, \sigma_{\theta y}, \sigma_{\theta z}, \sigma_{sx}, \sigma_{sy}, \sigma_{ox}$, and $\sigma_{oy}$ are variances of a rotation about x axis, a rotation about y axis, a rotation about z axis, a scale in x axis, a scale in y axis, an offset in x axis, and an offset in y axis respectively. In a preferred embodiment, N is 100.

Let the set of m motion vectors for the feature set #1 be $V_i=[v_x^{(i)} v_y^{(i)} 1]^T$ (i=1 to m) in homogeneous coordinates. Then a set of the revised features 111 can be derived from a set of modified motion vectors computed by $V_i'=P_k \times V_i$, for $1 \le i \le m$. In a preferred embodiment, each entry of a mean M is initialized from the identity matrix I×I, that is, $m_{\theta x}, m_{\theta y}, m_{\theta z}, m_{sx}, m_{sy}, m_{ox}$, and $m_{oy}$ are set as 0, 0, 0, 1, 1, 0, and 0, respectively, and $\sigma_{\theta x}, \sigma_{\theta y}, \sigma_{\theta z}, \sigma_{sx}, \sigma_{sy}, \sigma_{ox}$, and $\sigma_{oy}$ are set to 0, 0, 0, 0, 0, 20, and 2 respectively. In this case, the set of modifications are 2D translations only. Now the revised features 111 are inputs to the quality determiner 106.

In some embodiments, all of $\sigma_{\theta x}, \sigma_{\theta y}, \sigma_{\theta z}, \sigma_{sx}, \sigma_{sy}, \sigma_{ox}$, and $\sigma_{oy}$ are non-zeros. In this case, a set of candidate modifications is a set of full projective transformations. In the same manner, the set of the revised features 111 can be derived from a set of modified motion vectors computed by $V_i'=P_k \times V_i$ for $1 \le i \le m$. Next the revised features 111 are inputs to the quality determiner 106.

The quality determiner 106 evaluates the revised features 111 to produce a set of revised stereo quality scores 113. A best modification selector 114 then selects a particular candidate image transformation that produces the highest stereo quality score. The output of the step is the best medication and score 115, where the selected candidate image transformation is designated as the best modification $M_B$, and the corresponding quality score is designated as the best score $S_B$. Then the number of iteration T is updated as T=T+1.

A quality test 117 determines if $Q_B$ (the previous best quality score) is smaller than $S_B$. If YES then $Q_B=S_B$, and temporary storage for the best modification $P^*_B$ is updated as $P^*_B=M_B$.

A loop test 118 determines if a maximum iteration $T_{max}$ has been reached, or if $P_B=P^*_B$ (i.e., if the best modification has not changed). If YES, $P_B$ is updated as $P_B=P^*_B$ and the loop is exited. If NO, $P_B$ is updated as $P_B=P^*_B$ and execution returns to the feature modifier 110. Then a new set of modifications $P_k$ is generated, and the process repeats until the loop test 118 determines that the $P_B$ is not changing or a maximum iteration $T_{max}$ has been reached (whichever occurs first).

An output stereo image producer 116 then applies the best image transformation $P_B$ to the stereo image 132 to produce the improved stereo image 69. In a preferred embodiment, the output stereo image producer 116 applies the geometric image transformation computed from $P_B$ to the left view image 202. Then the improved stereo image 69 includes the revised left view image and the right view image 204. If the best quality store $Q_B$ is equal to the original stereo quality score $Q_O$ 108, then no improvement was identified and the stereo image 132 is directly output as the improved stereo image 69.

After the improved stereo image 69 has been formed, it is stored in a processor-accessible memory. It can also be displayed on the display 90 (FIG. 1) for review by a user.

In other embodiments, a smoothing based optimization proposed by M Leordeanu et al., "Smoothing-based Optimization" (Proceedings of IEEE Conference on Computer Vision and Pattern Recognition, pp. 1-8, 2008), can be used to compute the best modification $M_B$ and score $S_B$. In that case, the output of the quality determiner 112 can be used for f(x) in the work of Leordeanu et al., where the revised features 111 are used for x. The revised features 111 can be computed by $P_k$, which is drawn from the Gaussian distribution with a mean M and a covariance matrix C. In that case, M and C are initialized to be M=I×I and C=diag($\sigma_0, \ldots, \sigma_0$) initially where $\sigma_0$ is a user settable constant. Then they are updated to be a weighted mean and covariance matrix of sets of parameters generated by Gaussian distribution with a mean M and a covariance matrix C. Different from a preferred embodiment where C is constant and each entry of M is updated from $P_B$, M is updated as:

$$M = \frac{\sum_{i=1}^{N} f(x)x}{\sum_{i=1}^{N} f(x)} \quad (3)$$

and C is updated as C=diag($\sigma, \ldots, \sigma$) where $\sigma$ is given as:

$$\sigma = \sqrt{\frac{1}{D}\sum_{i=1}^{D}\frac{\sum_{j=1}^{N}(x_{ij}-m_i)^2 x_j}{\sum_{j=1}^{N} f(x_j)}} \quad (4)$$

where D is the dimension of $x_j$, $x_{ij}$ is $i^{th}$ entry of $x_j$, and N is the number of samples. Correspondingly, $S_B$ is computed as: $S_B$=f(M). This embodiment follows the rest of the aforementioned procedure depicted in FIG. 3.

The invention has been described in detail with particular reference to certain preferred embodiments thereof, but it will be understood that variations and modifications can be effected within the spirit and scope of the invention.

PARTS LIST 12 digital processor
20 digital imaging system
30 image capture subsystem
60 user controls
62 user preferences
69 improved stereo image
70 image processor
90 display
101 stereo quality detection unit
102 feature extractor
104 features
106 quality determiner
108 original stereo quality score
109 stereo image improvement unit
110 feature modifier
111 revised features
113 revised stereo quality scores
114 best modification selector
115 best modification and score
116 output stereo image producer
117 quality test
118 loop test
130 image sensor
132 stereo image
202 left view image
204 right view image
212 motion vector
213 image focus regions
306 row sum computer
308 left image row sum data
310 right image row sum data
312 vector offset computer
313 vector offset computer
314 vertical motion
316 column sum computer
318 left image column sum data
320 right image column sum data
321 horizontal motion
322 RAM buffer memory
323 storage memory
324 real-time clock
328 firmware memory
341 general purpose computer
350 wireless modem
358 mobile phone network
370 internet
375 image player

The invention claimed is:

1. A method for improving a stereo image including a left view image and a right view image, comprising:
using a digital processor to automatically analyze the stereo image to determine an original stereo quality score responsive to relative positions of corresponding points in the left view image and the right view image;
specifying a set of one or more candidate modifications to the stereo image;
determining revised stereo quality scores based on each of the candidate modifications to the stereo image;
generating a plurality of iterated revised stereo quality scores and a new set of modifications until either the iterated revised stereo quality score does not change or until an iteration limit is reached;
selecting a particular candidate modification that produces a revised stereo quality score which indicates a higher quality level than the original stereo quality score;
forming an output stereo image corresponding to the selected particular candidate modification; and
storing the output stereo image in a processor-accessible memory.

2. The method of claim 1 wherein the candidate modifications include applying a geometric transform to the left view image or the right view image or both.

3. The method of claim 2 wherein the geometric transform includes a translation, a rotation or a scaling operation.

4. The method of claim 2 wherein different geometric transforms are applied to different image regions.

5. The method of claim 1 wherein the set of one or more candidate modifications are determined using an iterative optimization process.

6. The method of claim 1 wherein each candidate modification is specified using one or more parameters.

7. The method of claim 6 wherein the set of one or more candidate modifications correspond to a systematic sampling of the one or more parameters.

8. The method of claim 7 wherein the systematic sampling involves selecting random values for the one or more parameters according to a predefined distribution.

9. The method of claim 7 wherein the systematic sampling involves selecting values for the one or more parameters according to a regular pattern.

10. The method of claim 1 wherein the selected particular candidate modification is the candidate modification that produces the revised stereo quality score corresponding to the highest quality level among the one or more candidate modifications.

11. The method of claim 1 wherein the process of determining the stereo quality score includes:

extracting a set of features from the stereo image, wherein the features include a set of motion vectors between corresponding points in the left view image and the right view image;

determining the stereo quality score using a classifier responsive to the set of features.

12. The method of claim 11 wherein the classifier is trained using a training set of stereo images having reference stereo quality scores determined by human observers.

13. The method of claim 11 wherein the set of motion vectors are determined by tracking a set of interest points between the left view image and the right view image.

14. The method of claim 13 wherein the set of interest points are tracked using a Kanade-Lucas-Tomasi feature tracking algorithm.

15. The method of claim 11 wherein the set of features further includes one or more features incorporating epipolar geometry characteristics determined from the set of motion vectors.

16. The method of claim 11 wherein the set of features further includes one or more features determined by applying statistical calculations to the set of motion vectors.

17. The method of claim 11 wherein the classifier is a support vector machine classifier.

18. The method of claim 1 further including displaying the stereo image pair using a stereo image display system.

* * * * *